United States Patent [19]
Neilson

[11] Patent Number: 5,357,592
[45] Date of Patent: Oct. 18, 1994

[54] OPTICAL ENERGY CONCENTRATOR/REFLECTOR
[75] Inventor: Eric H. Neilson, Orlando, Fla.
[73] Assignee: Martin Marietta Corporation, Bethesda, Md.
[21] Appl. No.: 108,107
[22] Filed: Aug. 17, 1993
[51] Int. Cl.⁵ ............................................. G02B 6/32
[52] U.S. Cl. ..................... 385/47; 385/15; 385/33; 385/36; 385/147; 385/901
[58] Field of Search .................. 385/15, 24, 26, 31, 385/33, 36, 44, 47, 146, 147, 900, 901; 362/32

[56] References Cited
U.S. PATENT DOCUMENTS

| | | | |
|---|---|---|---|
| 3,352,277 | 11/1967 | Schmidt | 385/901 X |
| 3,967,315 | 6/1976 | Goodman | 358/60 |
| 4,116,527 | 9/1978 | Sick | 356/200 X |
| 4,151,582 | 4/1979 | Grunberger | 385/901 X |
| 4,173,390 | 11/1979 | Käch | 385/47 X |
| 4,302,069 | 11/1981 | Niemi | 385/47 X |
| 4,379,613 | 4/1983 | Coburn | 385/900 X |
| 4,447,118 | 5/1984 | Mulkey | 385/47 X |
| 4,626,065 | 12/1986 | Mori | 385/147 X |
| 4,697,867 | 10/1987 | Blanc et al. | 385/147 X |
| 4,731,794 | 3/1988 | Schäfer | 372/70 |
| 4,798,949 | 1/1989 | Wilcox et al. | 250/203 R |
| 4,961,617 | 10/1990 | Shahidi et al. | 385/901 X |
| 5,257,331 | 10/1993 | Shapir | 385/146 X |

FOREIGN PATENT DOCUMENTS

| | | | |
|---|---|---|---|
| 1929736 | 2/1979 | Fed. Rep. of Germany | 385/43 X |
| 1-130109 | 5/1989 | Japan | 385/47 X |
| 3-23409 | 1/1991 | Japan | 385/24 X |
| 1543370 | 2/1990 | U.S.S.R. | |

OTHER PUBLICATIONS

E. M. Kritchman, "Asymmetric Second-Stage Concentrators," Applied Optics vol. 21, No. 5, pp. 870-873 (Mar. 1, 1982).
E. Hecht, Optics, 2d ed. pp. 166-169, 530-532, Addison-Wesley Publishing Co (1987).
R. S. Lawrence et al., "A Survey of Clear-Air Propagation Effects Relevant to Optical Communications," Proceedings of the IEEE vol. 58, No. 10, pp. 1523-1545 (Oct. 1970).
W. E. Williams, Applications of Interferometry, 4th ed., pp. 19-22, John Wiley and Sons, New York (1954).

Primary Examiner—Brian Healy
Attorney, Agent, or Firm—Burns, Doane, Swecker & Mathis

[57] ABSTRACT

An optical energy gathering device having a large annular area provides advantages over a lens having equal collection area. Coupled with advantages afforded by keeping the device geometry in a planar form, the optical energy concentrator/retroreflector allows a deployment freedom not usually associated with lensing systems. The energy concentrator includes a transparent sheet, a director disposed in the perimetral region of the sheet for directing electromagnetic energy incident on the perimetral region to a concentrating region of the sheet, and a router disposed at the concentrating region for routing the directed electromagnetic energy out of the sheet. The thickness of the sheet may be substantially less than the mean distance from the concentrating region of the sheet to the perimetral region, and the area of the sheet's perimetral region may be substantially less than the total area of the sheet. The sheet has electromagnetic wave-guiding properties, and is preferably deformable and conformable to a surface support such as an airfoil and the like.

20 Claims, 5 Drawing Sheets

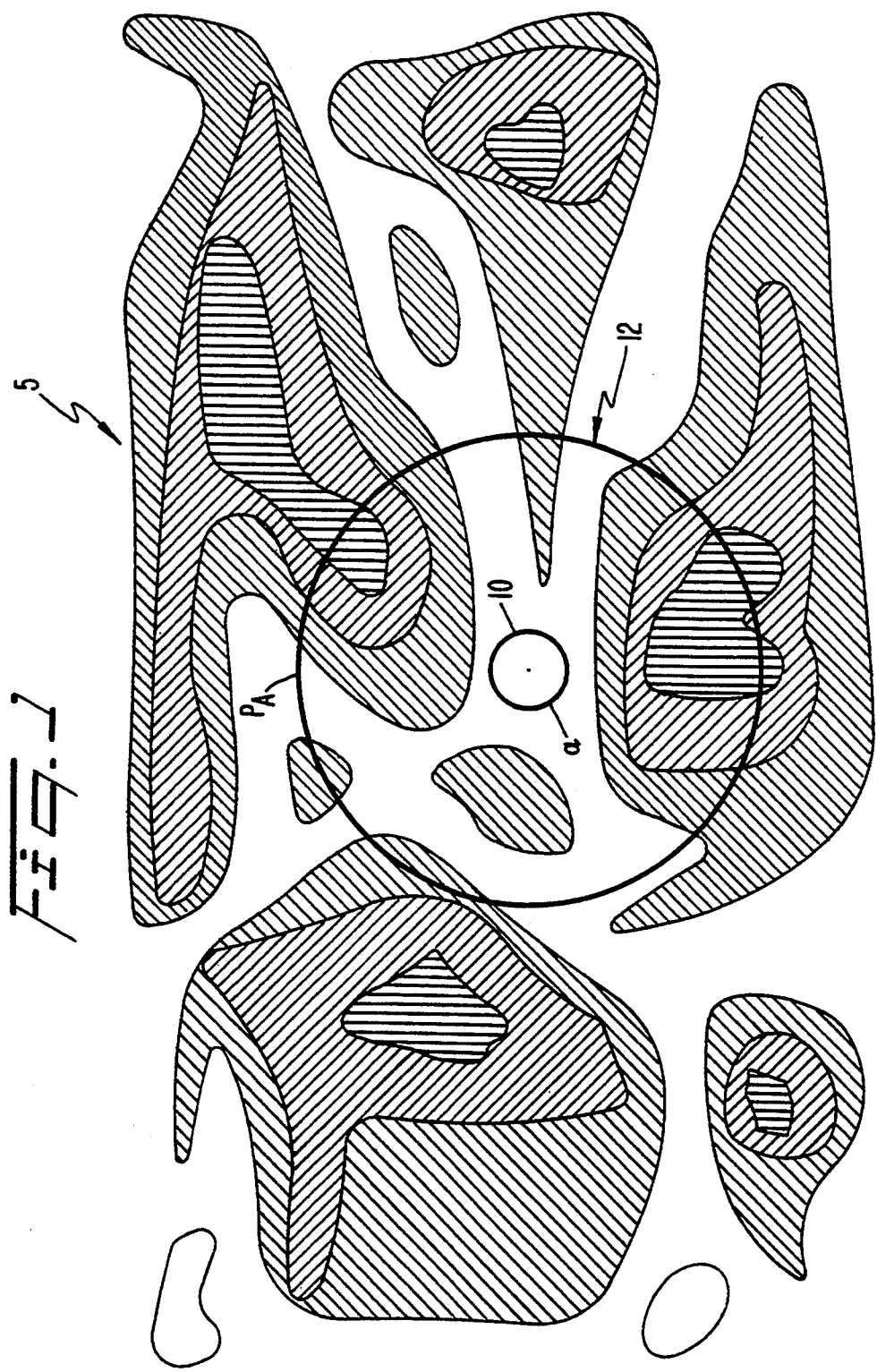

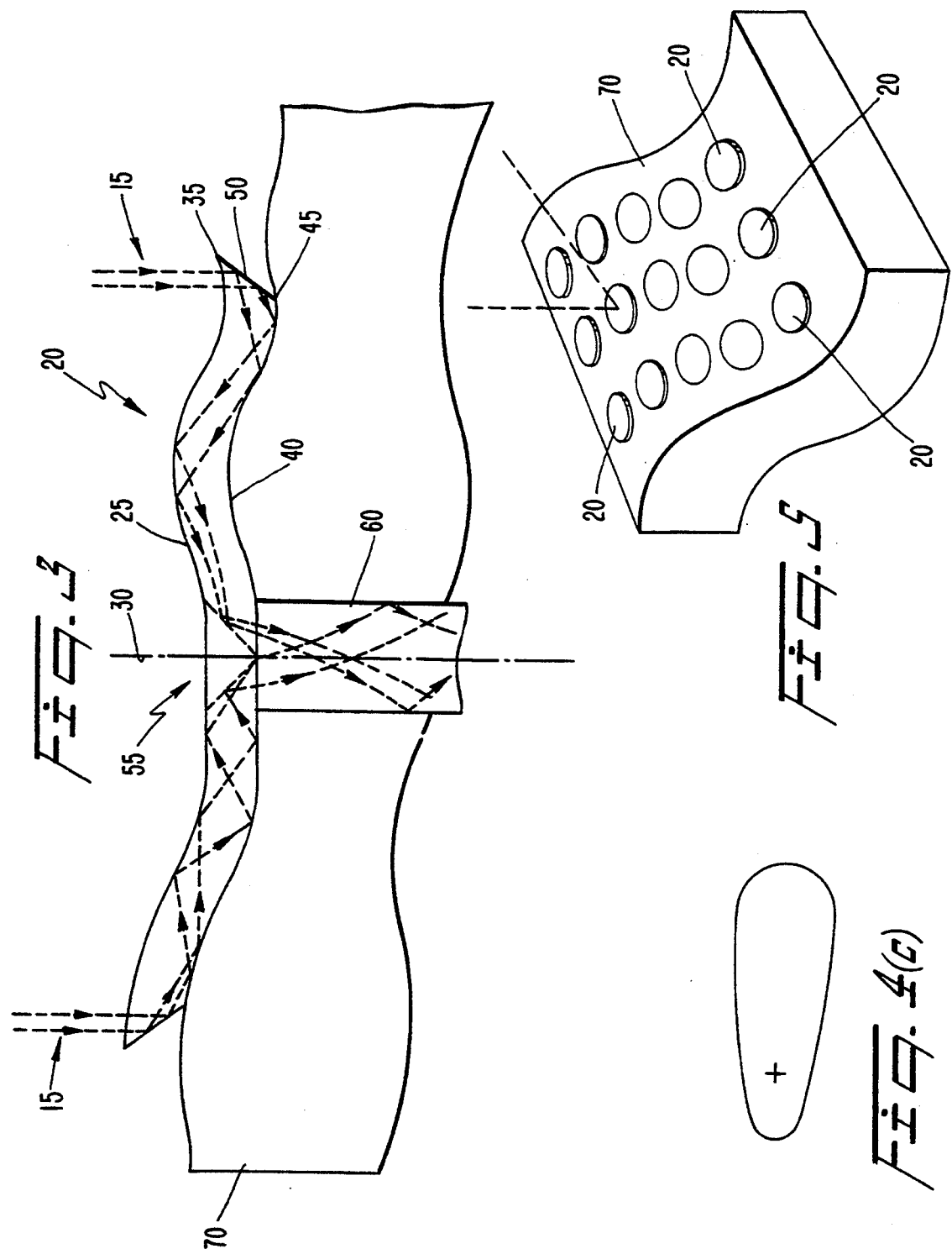

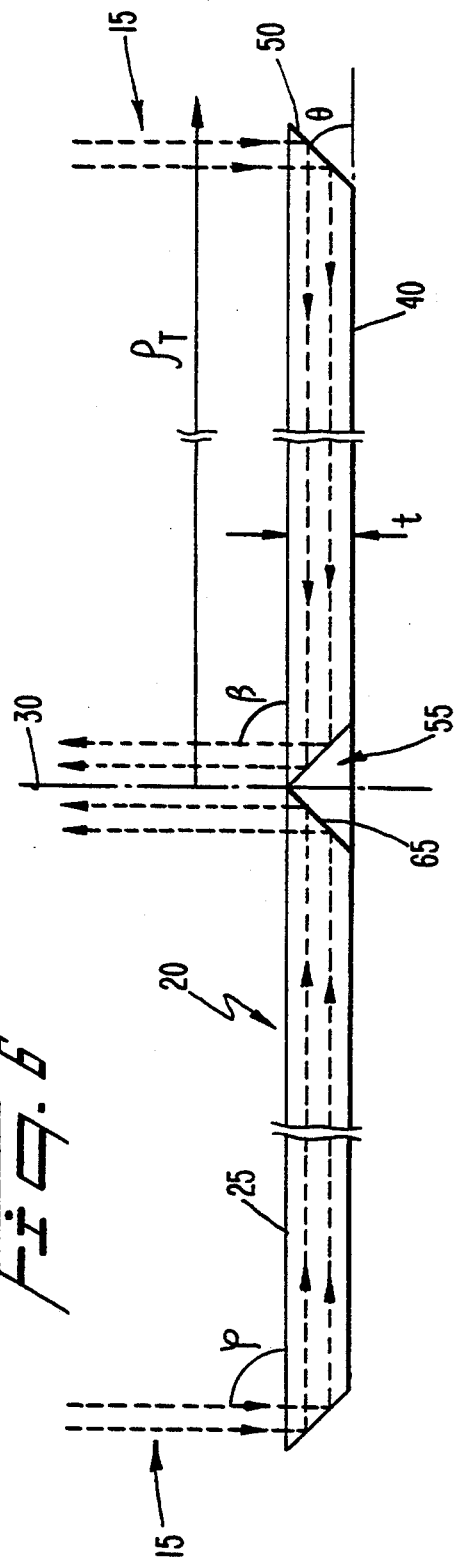
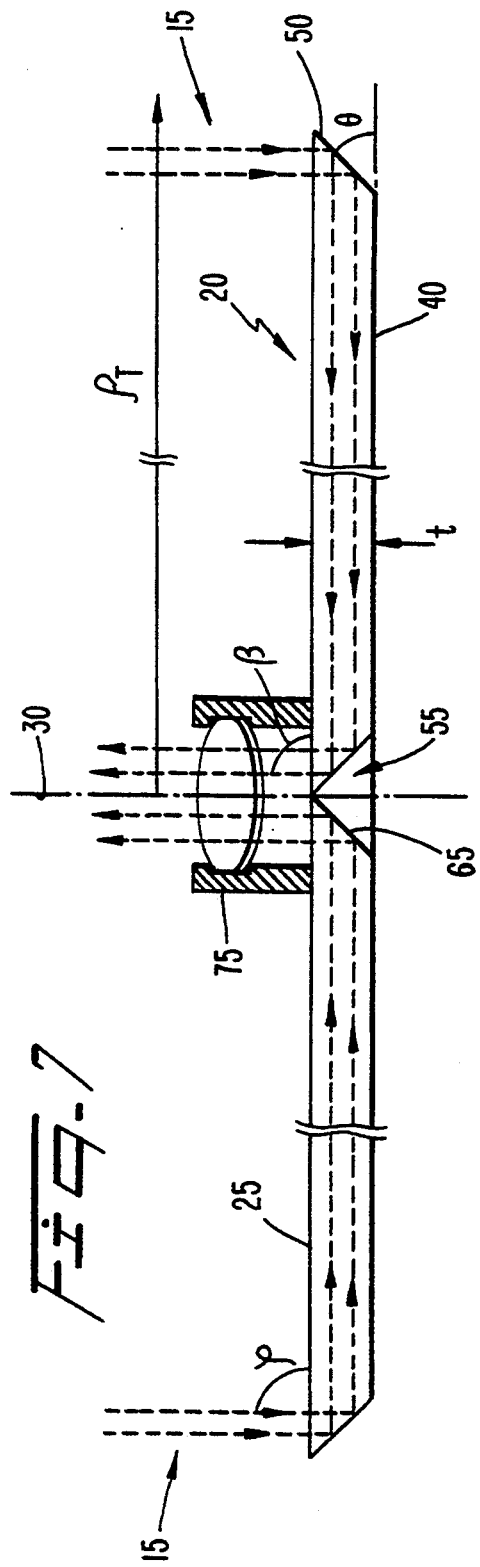

OPTICAL ENERGY CONCENTRATOR/REFLECTOR

BACKGROUND

Applicant's invention relates to a device for collecting optical energy, for example, portions of a laser beam, passing through an annular area and concentrating the collected energy to a point or a small-radius area. Compared to a conventional collector, such as a lens, that gathers energy passing through a circular area, the subject device reduces the effects of scintillations due to changes in the medium through which the optical energy passes by collecting energy from an area that is larger than the scale-size of such scintillations. Thus, the fluctuations in the various portions of the collected energy are uncorrelated and average out. The subject device also averages out speckle effects due to spatial incoherence of the laser beam.

Directed laser beams, when going through the atmosphere, are subject to a phenomenon called scintillation. Scintillation will cause a mottled pattern if the laser beam is viewed on a screen at some distance from the source, for example, a distance greater than about 2 kilometers. FIG. 1 illustrates the mottled pattern 5 in which different intensity levels are depicted by different cross-hatching. The pattern is in a constant state of flux, constantly "swimming" around at an audio frequency rate, due to air fluctuations. The sources of scintillation include winds, temperature gradients, aerosol makeup, humidity, and other attributes of an atmosphere that are absent in a vacuum.

For purposes of background, the following materials are noted: "A Survey of Clear-Air Propagation Effects Relevant to Optical Communications," *Proc. IEEE*, vol. 58, pp. 1523–45 (October 1970) by R. Lawrence et at.; *Applications of Interferometry*, 4th ed., pp. 19–22 (John Wiley and Sons, New York, 1954) by W. Williams; and Soviet Patent Application No. SU 1543370 (Feb. 15, 1990). Also, general techniques useful in optics are presented in many texts, for example, in *Optics* (Addison-Wesley, 1974) by E. Hecht and A. Zajac.

Lawrence et at. discloses that intensity fluctuations, or scintillations, in optical beams propagating through the atmosphere are well known and a subject of extensive study in astronomy and communications. Lawrence et at. also describes a technique of "smoothing", which involves combining uncorrelated intensity fluctuations to obtain an intensity that is a spatial average over the scintillations. Lawrence et al. notes that astronomical "seeing" is an "ill-defined" function of several factors, one of which is scintillation.

Williams describes the well-known Michelson stellar interferometer. Light from a star is collected by two widely separated mirrors and directed through a lens (or other concentrator) to a focal point where the beams from the two mirrors interfere. Williams discloses that the interference fringes can be distinct even when the star's image is "boiling".

The Soviet application describes a mirror-type optical concentrator in which an annular portion of the input light reflects from a primary mirror to a secondary mirror and then to a detector. Similar reflection paths are also seen in Gregorian and Cassegrainian telescopes.

These publications describe devices that collect energy from widely separated areas, but in general they seek to preserve the coherence of the collected energy for imaging or other purposes. It is not necessary to preserve such coherence, however, when all that is needed is a measure of a parameter such as average power and/or frequency. Accordingly, an energy concentrator/reflector that averages out scintillations and/or speckling effects and that can conform to a curved (non-flat) surface, such as an airfoil and the like, is highly desirable in the use of laser beams propagating through the atmosphere.

SUMMARY

In one aspect, Applicant's invention provides an electromagnetic energy concentrator, comprising a transparent sheet, a director disposed in the perimetral region of the sheet for directing electromagnetic energy incident on the perimetral region to a concentrating region of the sheet, and a router disposed at the concentrating region for routing the directed electromagnetic energy out of the sheet. The thickness of the sheet is preferably substantially less than the mean distance from the concentrating region of the sheet to the perimetral region, and the area of the sheet's perimetral region is substantially less than the total area of the sheet. The sheet has electromagnetic wave-guiding properties, and is flexibly deformable and conformable to a surface support such as an airfoil and the like.

A planar material having a refractive index of about 1.5, for example, in a sheet form can collect optical energy from the perimeter of the sheet when the perimeter's surface has an appropriate bias finish/geometry. The collected optical energy is directed to a single gathering or concentrating region. The increased optical energy density at this concentrating region can then be redirected or routed to perform work at other locations, for example when the concentrating region's surface has another appropriate bias finish/geometry.

In another aspect, the sheet comprises a material that is conformed to a supporting surface. The sheet can have a thickness of about three millimeters, and a mean distance from the central region of the sheet to the perimeter of the sheet of about thirteen centimeters. The director comprises a polished surface of the outer edge of the sheet. The router comprises a polished surface of a central region of the sheet.

In yet another aspect, the router directs the collected electromagnetic energy into an electromagnetic waveguide. The electromagnetic waveguide may have a cross-sectional length substantially the same as twice the thickness of the sheet. The electromagnetic waveguide is disposed on the surface of the sheet opposite to the surface of the sheet exposed to the incident electromagnetic energy. Alternatively, the router directs the collected electromagnetic energy reflectively in a direction making a substantially obtuse angle with the direction of the incident electromagnetic energy.

In still another aspect, Applicant's invention provides an optical energy concentrator including a transparent planar disk, a director disposed in an annular region near a perimeter of the disk for directing optical energy incident on the annular region to a concentrating region of the disk, and a router disposed in the concentrating region for routing the directed optical energy out of the disk. The thickness of the disk is substantially less than the radius of the disk, and the area of the annular region near the perimeter of the disk is substantially less than the total area of the disk.

In another aspect, the disk comprises a material having a refractive index of about 1.5, and the disk has a thickness of about three millimeters and a radius of about thirteen centimeters. The director comprises a polished surface of the outer edge of the disk. The router comprises a polished surface of a central region of the disk.

In yet another aspect, the router routes the directed optical energy into an optical fiber bundle. The optical fiber bundle has a radius substantially the same as the thickness of the disk. The optical fiber bundle is disposed on the surface of the disk opposite to the surface of the disk exposed to the incident optical energy. Alternatively, the router routes the directed optical energy reflectively in a direction making a substantially obtuse angle with the direction of the incident optical energy.

An optical energy concentrator according to Applicant's invention provides a consistent spatial "averaging" of an incident laser signal that has been subjected to a broad range of scintillation conditions. Since propagation of optical energy from the disk's perimetral collection area to the interior concentration area is similar to propagation of optical energy through a bundle of optical fibers, the disk can conformally fit a mounting surface with relatively small signal loss and with a low profile.

When configured as a retroreflector that routes the optical energy back towards its source, an optical energy concentrator according to Applicant's invention is similar to a cube corner reflector, but with the advantage that the optical energy is spatially averaged before being returned to its source. Such a reflective optical energy concentrator is thus a passive optical energy retroreflector that is not subject to hot or cold spotting since the returned signal is an averaged signal.

The concentrator can collect energy from a direction offset from the direction normal to the disk; this provides advantageous side viewing and arrangement of a plurality of disks in an array. The individual disks can be "squinted" for offset viewing, thereby allowing greater array flexibility, viz., separate elements are more easily grouped into an array. Furthermore, assemblies of disks can remain transparent on the mounting surface.

Optical energy concentrators according to Applicant's invention can accomplish many tasks at a fraction of the cost of other optical approaches to the same tasks. Besides being inexpensive, optical energy concentrators according to the present invention are also maintenance free, passive, and versatile.

BRIEF DESCRIPTION OF THE DRAWINGS

The features and advantages of Applicant's invention will be understood by reading the following detailed description in conjunction with the drawings, in which:

FIG. 1 shows a typical scintillation mottle pattern;

FIG. 3 shows an exemplary embodiment of an optical energy concentrator flexibly conforming to a non-planar surface;

FIG. 5 shows an array of squinted optical concentrators;

FIG. 6 shows a circular retroreflector configuration of an exemplary embodiment; and FIG. 7 shows a circular retroreflector configuration of an exemplary embodiment with a collimating assembly.

DETAILED DESCRIPTION

Figure 2A:
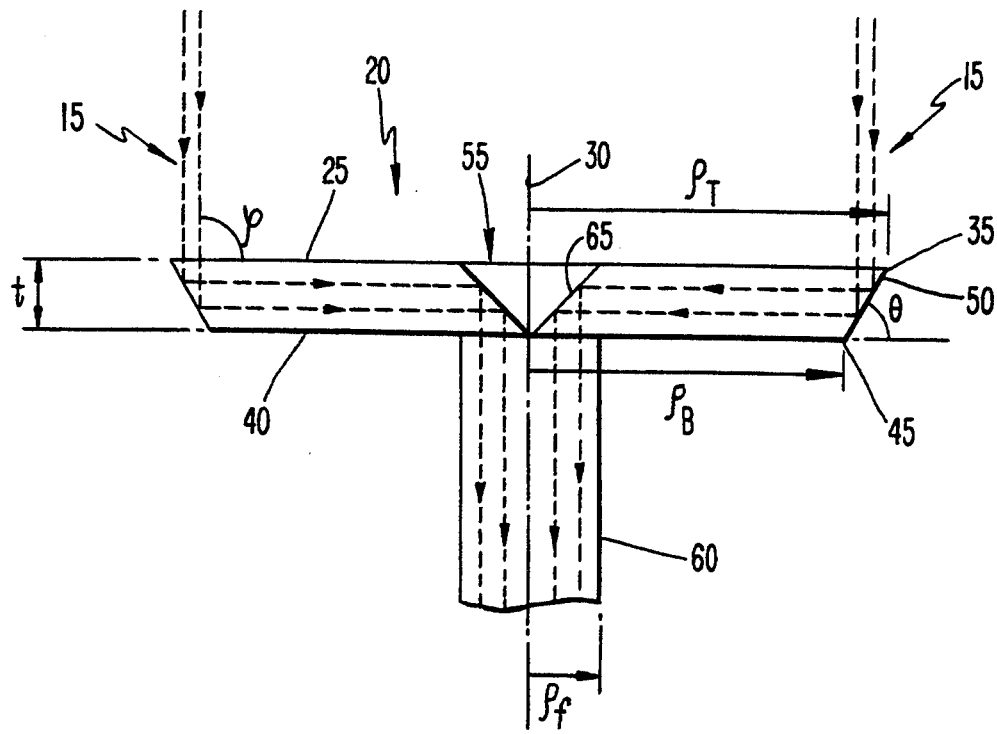
FIGS. 2(a) and 2(b) show side and top views, respectively, of an exemplary embodiment of an optical energy concentrator.

FIG. 1 shows a scaled 2.822-cm-radius collection lens 10 superimposed on a sample scintillation mottle pattern 5. Also shown in FIG. 1 is a scaled 12.70-cm-radius annular area 12 having a perimetral gathering area $P_A$ equivalent to the surface gathering area $\alpha$ of the lens 10. Annular area 12 provides a spatially averaged sampling of the scintillation mottle pattern 5 by virtue of its large radius. Lens 10 only monitors the immediate neighborhood of the central point of the lens, and therefore does not significantly average the scintillation mottle pattern 5.

This difference is important when the temporal variability of the atmospheric scintillations affects the use of the collected energy. For example, the chances are very slight that lens 10 will collect an accurate average of a laser intensity pattern 5 in a nanosecond time interval. Annular area 12, on the other hand, more accurately averages the pattern 5 in a short, e.g., nanosecond, time interval. Thus, a large radius annular area, such as area 12, provides a consistent average of a laser signal under a broader range of scintillation conditions, such as those that might be experienced by a laser communication system.

Figure 2B:
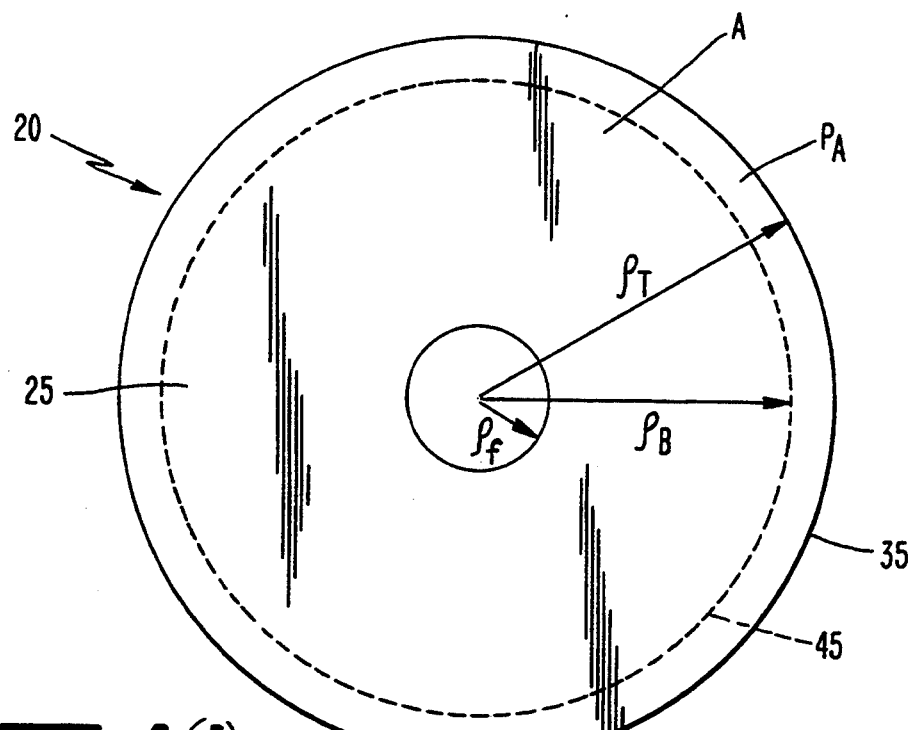

FIGS. 2(a) and 2(b) illustrate geometrical aspects of an exemplary embodiment of an optical energy concentrator 20 according to Applicant's invention. Light rays 15 are incident on top surface 25 of concentrator 20, making an angle $\phi$ with top surface 25, as shown in FIG. 2(a). Radial distance $\rho_T$ from the symmetry axis 30 to perimeter 35 of top surface 25 is greater than radial distance $\rho_B$ from the symmetry axis 30 to perimeter 45 of bottom surface 40. Polished perimetral edge surface 50 connects perimeter 35 with perimeter 45, and makes an angle $v$ with bottom surface 40. Concentrator 20 has thickness t which may be substantially the same as radius $\rho_f$ of an electromagnetic waveguide 60 such as an optical fiber or fiber bundle.

FIG. 2(b) shows that perimetral surface gathering area $P_A$ of concentrator 20 is given by the relation:

$$P_A = \pi(\rho_T^2 - \rho_B^2)$$

which can be expressed in terms of thickness t and angle $v$ as follows:

$$P_A = \pi\left[\rho_T^2 - \left(\rho_T - \frac{t}{\tan\theta}\right)^2\right] = \frac{\pi t}{\tan\theta}\left(2\rho_T - \frac{t}{\tan\theta}\right)$$

so that for $v = \pi/4$ the perimetral surface gathering area $P_A$ is:

$$P_A = \pi t[2\rho_T - t].$$

Area A of top surface 25 is given by the relation:

$$A = \pi[\rho_T^2]$$

so that the ratio of perimetral surface gathering area $P_A$ to area A of top surface 25 is given by the relation:

$$\frac{P_A}{A} = \frac{(\rho_T^2 - \rho_B^2)}{\rho_T^2} = 1 - \frac{\rho_B^2}{\rho_T^2}$$

which can also be expressed in terms of thickness t and angle $v$:

$$\frac{P_A}{A} = 1 - \frac{\left(\rho_T - \frac{t}{\tan\theta}\right)^2}{\rho_T^2} = \frac{t}{\rho_T \tan\theta}\left(2 - \frac{t}{\rho_T \tan\theta}\right)$$

so that for $v = \pi/4$ the ratio of $P_A$ to A is:

$$\frac{P_A}{A} = \frac{t}{\rho_T}\left(2 - \frac{t}{\rho_T}\right).$$

For example, for $v = \pi/4$, thickness t=3.175 mm, and radius $\rho_T$=12.70 cm, the perimetral surface gathering area $P_A$ is 25.02 cm² and the ratio of $P_A$ to A is 0.04938. The $\alpha$ of the 2.822-cm-radius lens 10 in FIG. 1 is also 25.02 cm².

Given the radius $\rho_f$ of optic fiber 60, the ratio of perimetral surface gathering area $P_A$ to the cross-sectional area $\pi(\rho_f)^2$ of optical fiber 60 is:

$$\frac{P_A}{\pi \rho_f^2} = \frac{(\rho_T^2 - \rho_B^2)}{\rho_f^2}$$

which can also be expressed in terms of thickness t and angle $v$:

$$\frac{P_A}{\pi \rho_f^2} = \frac{\rho_T^2 - \left(\rho_T - \frac{t}{\tan\theta}\right)^2}{\rho_f^2} = \frac{t\rho_T}{\rho_f^2 \tan\theta}\left(2 - \frac{t}{\rho_T \tan\theta}\right)$$

so that for $v = \pi/4$ the ratio of $P_A$ to $\pi(\rho_f)^2$ is:

$$\frac{P_A}{\pi \rho_f^2} = \frac{t\rho_T}{\rho_f^2}\left(2 - \frac{t}{\rho_T}\right).$$

For example, for $v = \pi/4$, thickness t=3.175 mm, radius $\rho_f$=3.2 mm, and radius $\rho_T$=12.70 cm, the ratio of PA to $\pi(\rho_f)^2$ is 79. For radius $\rho_T$ in the range from about 0 cm to about 50 cm, the perimetral surface gathering area $P_A$ ranges from about 0 cm² to about 100 cm², and the ratio of $P_A$ to $\pi(\rho_f)^2$ ranges from about 0 to about 320, where $v = \pi/4$, thickness t=3.2 mm, and radius $\rho_f$=3.2 min.

FIG. 2(a) also illustrates energy extraction using optical fiber bundle 60 from the optical energy concentrator 20. Central concentrating region 55 surrounding symmetry axis 30 has a polished surface 65 similar to polished perimetral edge surface 50. Polished surface 65 makes an angle of $\pi/4$ with symmetry axis 30, routing light rays 15 directed from polished perimetral edge surface 50 out of the disk of concentrator 20 and into optical fiber bundle 60. Light rays 15 routed into optical fiber bundle 60 are propagated along the fiber to a detector (not shown) and further processing circuits (not shown) for detection and further processing.

FIG. 3 illustrates the propagation of energy from the polished perimetral edge surface 50 of a deformable concentrator 20 to the central concentrating region 55 surrounding axis 30, showing the similarity with energy propagation in a fiber bundle, such as optical fiber 60, based on the total internal reflection of light rays 15. The similarity with energy propagation in a fiber bundle permits concentrator 20 to flexibly conform to the curvature of a mounting surface 70. Concentrator 20 can be fit to a curvilinear mounting surface 70 with a low-profile, and with very little signal loss penalty, provided total internal reflection in the concentrator 20 is permitted. Since preservation of the phase of the collected energy is not necessary for many applications, multiple internal reflections are permitted. Thus, it will be appreciated that the concentrator can be formed of many transparent materials, including many plastics and materials commonly used for optical fibers.

Optical concentrators 20 have been fabricated from 3.2-mm-thick and 6.4-mm-thick sheets of PLEXIGLAS polymer. The diameters of the sheets ranged from about 10 cm to 30 cm, and it is believed that 60 cm and larger sheets could be used. The surfaces 50, 65 were easily formed at 45° by lathe cuts of the sheet. It was found that such a concentrator transmitted about 60% of the visible light falling on the perimeter of the sheet. As described in more detail below, the index of refraction of the PLEXIGLAS polymer was such that metallization or other reflectivity-enhancing treatment was not needed on the surfaces 50, 65. In several of the concentrators, the optical fiber 60 was a commercially available fiber bundle, or light pipe, that was conveniently available. Such a bundle could be attached, for example by an adhesive, to the sheet if desired, or it could simply be held in position with respect to the concentrating region by any convenient means. Anti-reflection or suitable index-matching coatings could be applied to either or both of the sheet and fiber end if desired.

Figure 4B:
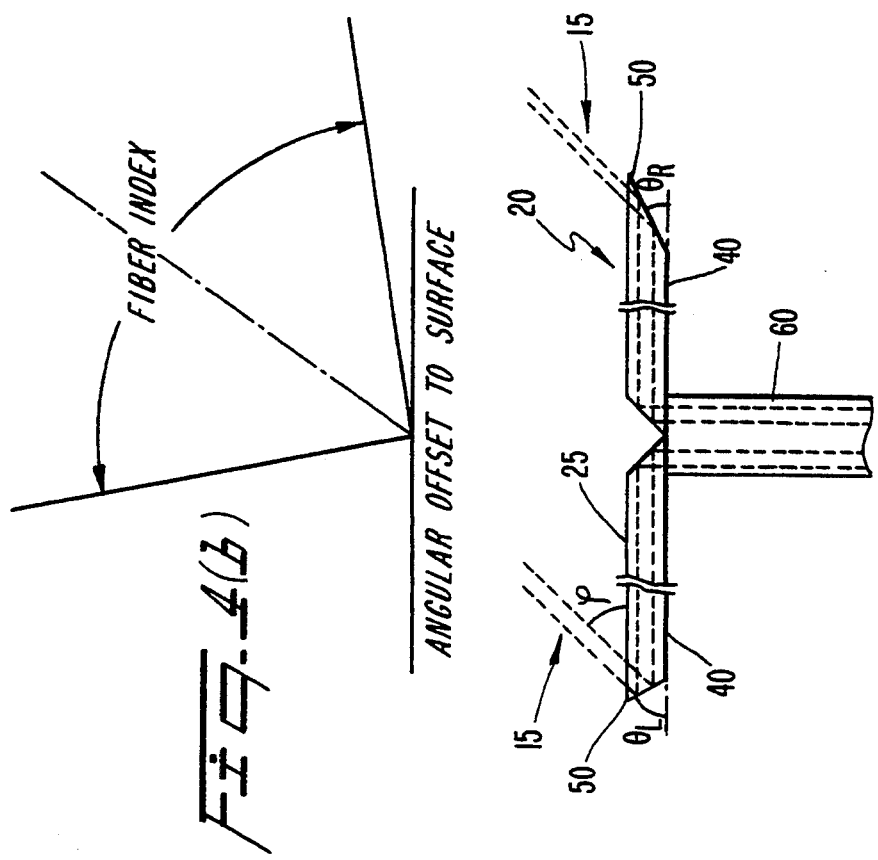
FIGS. 4.(i a) and 4(b) show light rays incident normal to the surface, and at an angular offset to the surface, respectively.
FIG. 4(c) depicts an off-axis lobe pattern of a "squinted" concentrator.
Figure 4A:
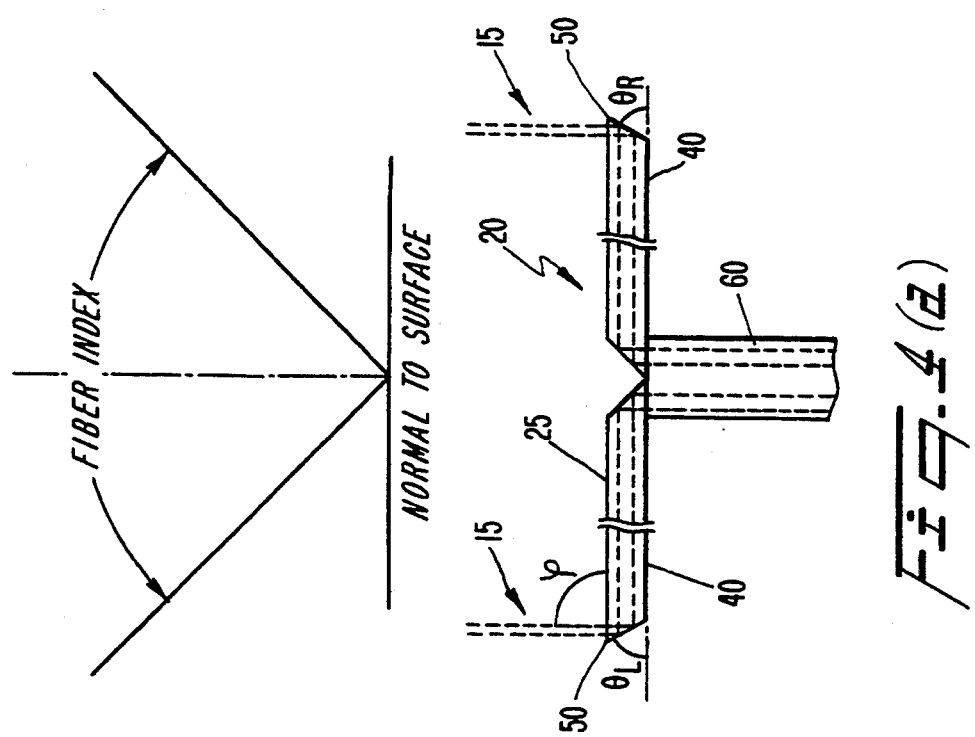

FIGS. 4(a) and 4(b) show light rays 15 incident normal to top surface 25, and at an angular offset to top surface 25, respectively. Polished perimetral edge surface 50 of concentrator 20 makes an angle $v_L$ with bottom surface 40 on the left side of concentrator 20, and makes an angle $v_R$ with bottom surface 40 on the right side of concentrator 20. FIG. 4(a) illustrates how the material refraction index and optical fiber characteristics of concentrator 20 can be combined appropriately with an efficacious perimetral geometry, where angle $v_L$ is substantially the same as angle $v_R$, in order to optimize optical energy concentration when incident light rays 15 make an angle $\phi = \pi/2$ with top surface 25. FIG. 4(b) illustrates how the material refraction index and optical fiber characteristics of concentrator 20 can be combined appropriately with an efficacious perimetral geometry, where angle $v_L$ is greater than angle $v_R$, in order to optimize optical energy concentrating when incident light rays 15 make an angle $\phi < \pi/2$ with top surface 25. It will be appreciated that where the desired angles are such that total internal reflection could fall, suitable claddings, coating, or other treatments would be applied to enable the energy collected at the periphery of the disk to propagate with sufficiently low losses to the concentrating region. It will be understood that as $v$ changes continuously between $v_R$ and $v_L$ due to the concentrator's circular symmetry, the concentrator is effectively "squinted", viz., it presents an off-axis lobe pattern such as that depicted in FIG. 4(c), rather than a circular lobe pattern centered on the axis 30 (indicated by the cross). Such "squinting" is similar to that seen in Archimedes-spiral radar antennas.

The collection direction of the concentrator can be offset from the surface normal as depicted in FIG. 4(c), advantageously allowing side viewing when a plurality of concentrators 20 are arranged in an array as illustrated in FIG. 5. Each concentrator 20 in the array can be individually "squinted" to effect offset viewing, allowing greater array flexibility. Assemblies of concentrators 20 can also remain transparent on the mounting surface 70. Overlapping the off-axis lobe patterns of the concentrator array elements enables the array to be used to determine the direction of a light source.

FIG. 6 illustrates retroreflective energy extraction, showing a central cross-section of another exemplary embodiment of an optical energy concentrator 20. Preferably, $\upsilon = \pi/4$, thickness $t = 3.2$ mm, fiber radius $\rho_f = 3.2$ mm, concentrator top radius $\rho_T = 12.70$ cm, and light rays 15 fall on top surface 25 of concentrator 20, making an angle $\phi = \pi/2$ with top surface 25. Central concentrating region 55 surrounding symmetry axis 30 has a polished surface 65 similar to polished perimetral edge surface 50. Polished surface 65 makes an angle of $\pi/4$ with symmetry axis 30, routing light rays 15 directed from polished perimetral edge surface 50 out of the disk of concentrator 20 and substantially back in the direction whence the incident light rays 15 came. The light rays 15 are routed reflectively in a direction making an angle $\alpha$ with top surface 25, thereby making a substantially obtuse angle $\phi + \alpha$ greater than about $\pi/2$ with the direction of the incident light rays 15.

A circular retroreflector 20 as shown in FIG. 6 functions like a cube corner, but with the added advantage that the collected energy is spatially averaged before being returned to the source of the energy. Thus a circular retroreflector 20 is a passive energy retroreflector that is not subject to hot or cold spotting, and the returned energy signal is an averaged signal.

FIG. 7 shows a circular retroreflector 20 with a collimating assembly 75 comprising a lens system for collimating or further focussing the returned averaged energy signal. The lens system typically would be configured to match the end of an optical fiber (not shown) that could "loop" off the surface supporting the retroreflector 20 to a collection point. The other components of the retroreflector 20 are as described above with respect to the other embodiments of Applicant's invention.

Apparatus according to Applicant's invention advantageously provides a less costly way of accomplishing a family of tasks that other optical approaches can only accomplish at much greater expense. An optical energy concentrator according to the invention is relatively inexpensive, maintenance free, passive, and flexible in application. For example, Applicant's concentrators could be used in stations for point-to-point light communication to eliminate or substantially reduce the effects of atmospheric fluctuations on the communication beam. Also, Applicant's concentrator can be used as an optical pulse stretcher by simply offsetting the position of the concentrating region 55 with respect to the axis of edge surface 50 so that light inciding at some portions of the surface 50 takes longer to reach the concentrating region 55 than light inciding on other portions of the concentrating region.

Applicant's invention has been described above in terms of specific embodiments. It will be readily appreciated by one of ordinary skill in the art, however, that the invention is not limited to those embodiments, and that, in fact, the principles of the invention may be embodied and practiced in devices and methods other than those specifically described above. Therefore, the invention should not be regarded as delimited by those specific embodiments, but by the following claims.

What is claimed is:

1. An electromagnetic energy concentrator, comprising:
   a transparent sheet;
   means including a polished surface, disposed in a perimetral region of the sheet, for gathering electromagnetic energy incident on a top surface of the sheet at the perimetral region and directing said electromagnetic energy to a concentrating device; and
   a concentrating device including a polished surface, disposed, proximate a center of said sheet, for focusing the directed electromagnetic energy into a waveguide;
   wherein a thickness of the sheet is substantially less than a mean distance from the concentrating region to the perimetral region, an area of the perimetral region is substantially less than a total area of the sheet, and the sheet guides the directed electromagnetic energy toward the routing means.

2. The concentrator of claim 1, wherein the concentrating device retroreflects the directed electromagnetic energy.

3. An optical energy concentrator, comprising:
   a transparent planar disk;
   means including a polished surface, disposed in an annular perimetral region of the disk, for gathering optical energy incident on a top surface of the disk at the annular region and directing said optical energy to a concentrating device; and
   a concentrating device including a polished surface, disposed proximate a center of said disk, for focusing the directed optical energy into a waveguide;
   wherein a thickness of the disk is substantially less than a mean radius of the disk, and wherein an area of the annular perimetral region is substantially less than a total area of the disk.

4. The concentrator of claim 3, wherein the routing means routes the directed optical energy reflectively in a direction making a substantially obtuse angle with a direction of the incident optical energy.

5. The concentrator of claim 1 wherein said transparent sheet has a refractive index of 1.5.

6. The concentrator of claim 1 wherein said mean distance is about 100 times greater than said thickness of said transparent sheet.

7. The concentrator of claim 1 wherein said transparent sheet has electromagnetic waveguiding properties and is made from a flexible material.

8. The concentrator of claim 7 further comprising a mounting structure having a wavy outer surface, wherein said flexible transparent sheet is conformed to said wavy outer surface.

9. The concentrator of claim 1 wherein said gathering and directing means is disposed only in said perimetral region of said transparent sheet.

10. The concentrator of claim 3 wherein said transparent planar disk has a refractive index of 1.5.

11. The concentrator of claim 3 wherein said mean radius is about 100 times greater than said thickness of said transparent planar disk.

12. The concentrator of claim 3 wherein said transparent planar disk has electromagnetic waveguiding properties and is made from a flexible material.

13. The concentrator of claim 12 further comprising a mounting structure having a wavy outer surface, wherein said flexible transparent planar sheet is conformed to said wavy outer surface.

14. The concentrator of claim 3 wherein said gathering and directing means is disposed only in said perimetral region of said transparent planar disk.

15. An energy concentrator comprising:
 a transparent structure;
 means for gathering and concentrating energy incident on a top surface of the structure at a perimetral region thereof and for averaging a scintillation pattern of said incident energy; and
 means for routing said concentrating, average incident energy out of said structure.

16. The concentrator of claim 15 wherein said transparent structure has a refractive index of 1.5.

17. The concentrator of claim 15 wherein said structure has mean distance to a perimeter which is about 100 times greater than a thickness thereof.

18. The concentrator of claim 15 wherein said transparent structure has electromagnetic waveguiding properties and is made from a flexible material.

19. The concentrator of claim 18 further comprising a mounting structure having a wavy outer surface, wherein said flexible transparent structure is conformed to said wavy outer surface.

20. The concentrator of claim 15 wherein said gathering and directing means is disposed only in said perimetral region of said transparent structure.

* * * * *